(12) United States Patent
Miller (10) Patent No.: US 8,755,930 B2
(45) Date of Patent: Jun. 17, 2014

(54) METHOD, APPARATUS, AND COMPUTER PROGRAM PRODUCT FOR OPTIMIZATION OF ITEM LOCATION IN AN AUTOMATED STORAGE SYSTEM

(75) Inventor: George Brad Miller, Bellevue, PA (US)

(73) Assignee: Aesynt Incorporated, Cranberry, PA (US)

( * ) Notice: Subject to any disclaimer, the term of this patent is extended or adjusted under 35 U.S.C. 154(b) by 130 days.

(21) Appl. No.: 13/436,427

(22) Filed: Mar. 30, 2012

(65) Prior Publication Data
US 2013/0261788 A1 Oct. 3, 2013

(51) Int. Cl.
*G06F 7/00* (2006.01)
*G06F 17/00* (2006.01)

(52) U.S. Cl.
USPC ........... 700/214; 700/213; 700/215; 700/216; 700/218; 700/219; 700/220; 700/228; 700/243

(58) Field of Classification Search
None
See application file for complete search history.

(56) References Cited

U.S. PATENT DOCUMENTS

| | | |
|---|---|---|
| 4,717,042 A | 1/1988 | McLaughlin |
| 4,785,969 A | 11/1988 | McLaughlin |
| 4,847,764 A | 7/1989 | Halvorson |
| 5,014,875 A | 5/1991 | McLaughlin et al. |
| 5,190,185 A | 3/1993 | Blechl |
| 5,314,243 A | 5/1994 | McDonald et al. |
| 5,346,297 A | 9/1994 | Colson, Jr. et al. |
| 5,377,864 A | 1/1995 | Blechl et al. |
| 5,405,048 A | 4/1995 | Rogers et al. |
| 5,431,299 A | 7/1995 | Brewer et al. |
| 5,460,294 A | 10/1995 | Williams |
| 5,468,110 A | 11/1995 | McDonald et al. |
| 5,480,062 A | 1/1996 | Rogers et al. |
| 5,520,450 A | 5/1996 | Colson, Jr. et al. |
| 5,564,803 A | 10/1996 | McDonald et al. |
| 5,593,267 A | 1/1997 | McDonald et al. |
| 5,661,978 A | 9/1997 | Holmes et al. |
| D384,578 S | 10/1997 | Wangu et al. |
| 5,713,485 A | 2/1998 | Liff et al. |
| 5,716,114 A | 2/1998 | Holmes et al. |
| 5,745,366 A | 4/1998 | Higham et al. |
| 5,761,877 A | 6/1998 | Quandt |
| 5,797,515 A | 8/1998 | Liff et al. |
| 5,805,456 A | 9/1998 | Higham et al. |
| 5,842,976 A | 12/1998 | Williamson |
| 5,878,885 A | 3/1999 | Wangu et al. |
| 5,880,443 A | 3/1999 | McDonald et al. |
| 5,883,806 A | 3/1999 | Meador et al. |
| 5,893,697 A | 4/1999 | Zini et al. |
| 5,905,653 A | 5/1999 | Higham et al. |
| 5,912,818 A | 6/1999 | McGrady et al. |

(Continued)

*Primary Examiner* — Yolanda Cumbess
(74) *Attorney, Agent, or Firm* — Alston & Bird LLP (57) ABSTRACT

The present invention generally relates to a method, apparatus, and computer program product for optimizing article or bin location in an automated storage device to increase the efficiency of article retrieval in filling an order. Methods of example embodiments may determine a number of touches of each of a plurality of bins of a storage system, where the touches are calculated over a predetermined period of time, identify a bin with more touches than a bin at a first location, where the bin with more touches is at a second location, and direct the bin with more touches than the bin at the first location to be swapped with the bin at the first location. Identifying a bin with more touches may include identifying a bin with a number of touches that exceeds the number of touches of the bin in the first location by a predetermined amount.

21 Claims, 7 Drawing Sheets

(56) References Cited

U.S. PATENT DOCUMENTS

| | | |
|---|---|---|
| 5,927,540 A | 7/1999 | Godlewski |
| 5,940,306 A | 8/1999 | Gardner et al. |
| 5,971,593 A | 10/1999 | McGrady |
| 6,003,006 A | 12/1999 | Colella et al. |
| 6,011,999 A | 1/2000 | Holmes |
| 6,021,392 A | 2/2000 | Lester et al. |
| 6,039,467 A | 3/2000 | Holmes |
| 6,065,819 A | 5/2000 | Holmes et al. |
| 6,068,156 A | 5/2000 | Liff et al. |
| 6,109,774 A | 8/2000 | Holmes et al. |
| 6,112,502 A | 9/2000 | Frederick et al. |
| 6,116,461 A | 9/2000 | Broadfield et al. |
| 6,151,536 A | 11/2000 | Arnold et al. |
| 6,170,230 B1 | 1/2001 | Chudy et al. |
| 6,176,392 B1 | 1/2001 | William et al. |
| 6,189,727 B1 | 2/2001 | Shoenfeld |
| 6,223,934 B1 | 5/2001 | Shoenfeld |
| 6,256,967 B1 | 7/2001 | Hebron et al. |
| 6,283,322 B1 | 9/2001 | Liff et al. |
| 6,289,656 B1 | 9/2001 | Wangu et al. |
| 6,338,007 B1 | 1/2002 | Broadfield et al. |
| 6,339,732 B1 | 1/2002 | Phoon et al. |
| 6,361,263 B1 | 3/2002 | Dewey et al. |
| 6,370,841 B1 | 4/2002 | Chudy et al. |
| 6,449,927 B2 | 9/2002 | Hebron et al. |
| 6,471,089 B2 | 10/2002 | Liff et al. |
| 6,497,342 B2 | 12/2002 | Zhang et al. |
| 6,499,270 B2 | 12/2002 | Peroni et al. |
| 6,532,399 B2 | 3/2003 | Mase |
| 6,564,121 B1 | 5/2003 | Wallace et al. |
| 6,581,798 B2 | 6/2003 | Liff et al. |
| 6,609,047 B1 | 8/2003 | Lipps |
| 6,611,733 B1 | 8/2003 | De La Huerga |
| 6,625,952 B1 | 9/2003 | Chudy et al. |
| 6,640,159 B2 | 10/2003 | Holmes et al. |
| 6,650,964 B2 | 11/2003 | Spano, Jr. et al. |
| 6,671,579 B2 | 12/2003 | Spano, Jr. et al. |
| 6,681,149 B2 | 1/2004 | William et al. |
| 6,742,671 B2 | 6/2004 | Hebron et al. |
| 6,755,931 B2 | 6/2004 | Vollm et al. |
| 6,760,643 B2 | 7/2004 | Lipps |
| 6,776,304 B2 | 8/2004 | Liff et al. |
| 6,785,589 B2 | 8/2004 | Eggenberger et al. |
| 6,790,198 B1 | 9/2004 | White et al. |
| 6,814,254 B2 | 11/2004 | Liff et al. |
| 6,814,255 B2 | 11/2004 | Liff et al. |
| 6,847,861 B2 | 1/2005 | Wangu et al. |
| 6,874,684 B1 | 4/2005 | Denenberg et al. |
| 6,892,780 B2 | 5/2005 | Vollm et al. |
| 6,895,304 B2 | 5/2005 | Spano, Jr. et al. |
| 6,975,922 B2 | 12/2005 | Duncan et al. |
| 6,985,797 B2 | 1/2006 | Spano, Jr. et al. |
| 6,996,455 B2 | 2/2006 | Eggenberger et al. |
| 7,010,389 B2 | 3/2006 | Lunak et al. |
| 7,014,063 B2 | 3/2006 | Shows et al. |
| 7,016,766 B2 | 3/2006 | William et al. |
| 7,040,504 B2 | 5/2006 | Broadfield et al. |
| 7,052,097 B2 | 5/2006 | Meek, Jr. et al. |
| 7,072,737 B2 | 7/2006 | Lunak et al. |
| 7,072,855 B1 | 7/2006 | Godlewski et al. |
| 7,077,286 B2 | 7/2006 | Shows et al. |
| 7,085,621 B2 | 8/2006 | Spano, Jr. et al. |
| 7,092,796 B2 | 8/2006 | Vanderveen |
| 7,093,755 B2 | 8/2006 | Jordan et al. |
| 7,100,792 B2 | 9/2006 | Hunter et al. |
| 7,103,419 B2 | 9/2006 | Engleson et al. |
| 7,111,780 B2 | 9/2006 | Broussard et al. |
| 7,139,639 B2 | 11/2006 | Broussard et al. |
| 7,150,724 B2 | 12/2006 | Morris et al. |
| 7,171,277 B2 | 1/2007 | Engleson et al. |
| 7,218,231 B2 | 5/2007 | Higham |
| 7,228,198 B2 | 6/2007 | Vollm et al. |
| 7,249,688 B2 | 7/2007 | Hunter et al. |
| 7,348,884 B2 | 3/2008 | Higham |
| 7,417,729 B2 | 8/2008 | Greenwald |
| 7,419,133 B2 | 9/2008 | Clarke et al. |
| 7,426,425 B2 | 9/2008 | Meek, Jr. et al. |
| 7,554,449 B2 | 6/2009 | Higham |
| 7,571,024 B2 | 8/2009 | Duncan et al. |
| 7,588,167 B2 | 9/2009 | Hunter et al. |
| 8,036,773 B2 | 10/2011 | Braun et al. |
| 2002/0095238 A1* | 7/2002 | Ahlin et al. ............ 700/243 |

\* cited by examiner

FIG. 7

METHOD, APPARATUS, AND COMPUTER PROGRAM PRODUCT FOR OPTIMIZATION OF ITEM LOCATION IN AN AUTOMATED STORAGE SYSTEM

FIELD OF THE INVENTION

The present invention relates to re-organizing the locations of articles in an automated storage system, and more particularly to providing a method, apparatus, and computer program product to determine the location of articles and bins in an automated storage system in order to optimize the efficiency of item retrieval.

BACKGROUND

Automated storage systems are often used to store quantities of items and to present the items to a user for retrieval proximate an accessible loading/unloading point. Storage systems may include a carousel including a plurality of shelves, each shelf including a plurality of bins, where each bin may include one or more types of articles stored therein. Depending upon the size of the articles and the size of the bins, a plurality of each of the one or more types of articles may be stored in each bin for retrieval by a user. Automated storage systems may include a user interface in which a user may enter an article request or order by some identifying indicia (e.g., by name, identification number, etc.) and the automated storage system may advance the carousel to present the bin containing the article, or shelf containing the bin, to the user. The user may be directed to the appropriate bin through a display which identifies the location graphically or by alphanumeric indicator and to the appropriate article through a graphical or alphanumeric identifier.

In such automated storage systems, retrieval time for each article may depend upon how far the carousel must rotate or move between shelves or the "rotation time." The speed of the carousel may be limited as the articles contained in the bins may be adversely affected by sudden movement or by frequent start/stop cycles at faster speeds. Further, the bin locations and contents may be undesirably shifted by higher carousel speeds. Thus, the distance the carousel must move between shelves may impart a significant time-delay in the retrieval of articles that are located further apart from one another (i.e., separated by a number of shelves).

SUMMARY

Embodiments of the present invention generally relate to a method, apparatus, and computer program product for optimizing article or bin location in an automated storage device to increase the efficiency of article retrieval in filling an order. Methods of example embodiments may determine a number of touches of each of a plurality of bins of a storage system, where the touches are calculated over a predetermined period of time; identify a bin with more touches than a bin at a first location, where the bin with more touches is at a second location; and direct the bin with more touches than the bin at the first location to be swapped with the bin at the first location. Identifying a bin with more touches may include identifying a bin with a number of touches that exceeds the number of touches of the bin in the first location by a predetermined amount.

Methods of example embodiments may include where, upon directing the bin from the first location to be swapped with the bin in the second location, precluding the bin from the first location from being moved again. The storage system may include bins of multiple sizes and identifying a bin with more touches than a bin at a first location may include identifying a bin with more touches of the same size as the bin at the first location. The storage system may include a plurality of shelves, and each shelf may include a plurality of bins. Identifying a bin with more touches than a bin at a first location may include identifying a bin with more touches on a shelf different from that of the bin at the first location. Methods of example embodiments may increase the likelihood that a picked article will be within three shelves of a next-picked article in response to swapping the bin at the first location with the bin at the second location. A touch may include an instance of a user accessing a bin.

Embodiments of the present invention may include a computer program product which includes at least one non-transitory computer-readable storage medium having computer-executable program code instructions stored therein, the computer-executable program code instructions including program code instructions for determining a number of touches each of a plurality of bins of a storage system has experienced over a predetermined time period, program code instructions for identifying a bin with more touches than a bin at a first location, where the bin with more touches is at a second location, and program code instructions to direct the bin with more touches than the bin at the first location to be swapped with the bin at the first location. The program code instructions for identifying a bin with more touches may include program code instructions for identifying a bin with a number of touches that exceeds the number of touches of the bin in the first location by a predetermined amount.

Computer program products according to example embodiments may further include where the program code instructions for directing the bin with more touches than the bin at the first location to be swapped with the bin at the first location includes program code instructions to preclude the bin from the first location from being moved again. The storage system may include bins of multiple sizes and the program code instructions for identifying a bin with more touches than a bin at a first location may include program code instructions for identifying a bin of the same size with more touches as the bin at the first location. The storage system may include a plurality of shelves, and each shelf may include a plurality of bins. The program code instructions for identifying a bin with more touches than a bin at the first location may include program code instructions for identifying a bin with more touches on a shelf different from that of the bin at the first location. Computer program products of example embodiments may further include program code instructions for increasing the likelihood that the picked article will be within three shelves of a next-picked article in response to swapping the bin at the first location with the bin at the second location.

Embodiments of the present invention may provide an apparatus including processing circuitry configured to cause the apparatus to determine a number of touches each of a plurality of bins of a storage system has experienced over a predetermined time period, identify a bin with more touches than a bin at a first location, where the bin with more touches is as at a second location, and direct the bin with more touches than the bin at the first location to be swapped with the bin at the first location. Identifying a bin with more touches may include identifying a bin with a number of touches that exceeds the number of touches of the bin in the first location by a predetermined amount. Upon directing the bin with more touches than the bin at the first location to be swapped with the bin at the first location, the processing circuitry may be configured to preclude the bin from the first location from being moved again. The storage system may include bins of multiple sizes and identifying a bin with more touches than a bin at a first location may include identifying a bin of the same size with more touches than the bin at the first location. The storage system may include a plurality of shelves and each shelf may include a plurality of bins. Identifying a bin with more touches than a bin at a first location may include identifying a bin with more touches on a shelf different from that of the bin at the first location.

BRIEF DESCRIPTION OF THE SEVERAL VIEWS OF THE DRAWING(S)

Reference will now be made to the accompanying drawings, which are not necessarily drawn to scale, and wherein.

DETAILED DESCRIPTION

Embodiments of the present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. The terms top, bottom, side, up, down, upwards, downwards, vertical, horizontal, and the like as used below do not imply a required limitation in all embodiments of the present invention but rather are used herein to help describe relative direction or orientation in exemplary embodiments illustrated in the figures.

As should be appreciated, various embodiments may be implemented in various ways, including as methods, apparatus, systems, or computer program products. Accordingly, various embodiments may take the form of an entirely hardware embodiment or an embodiment in which a processor is programmed to perform certain steps. Furthermore, various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Various embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

Figure 1:
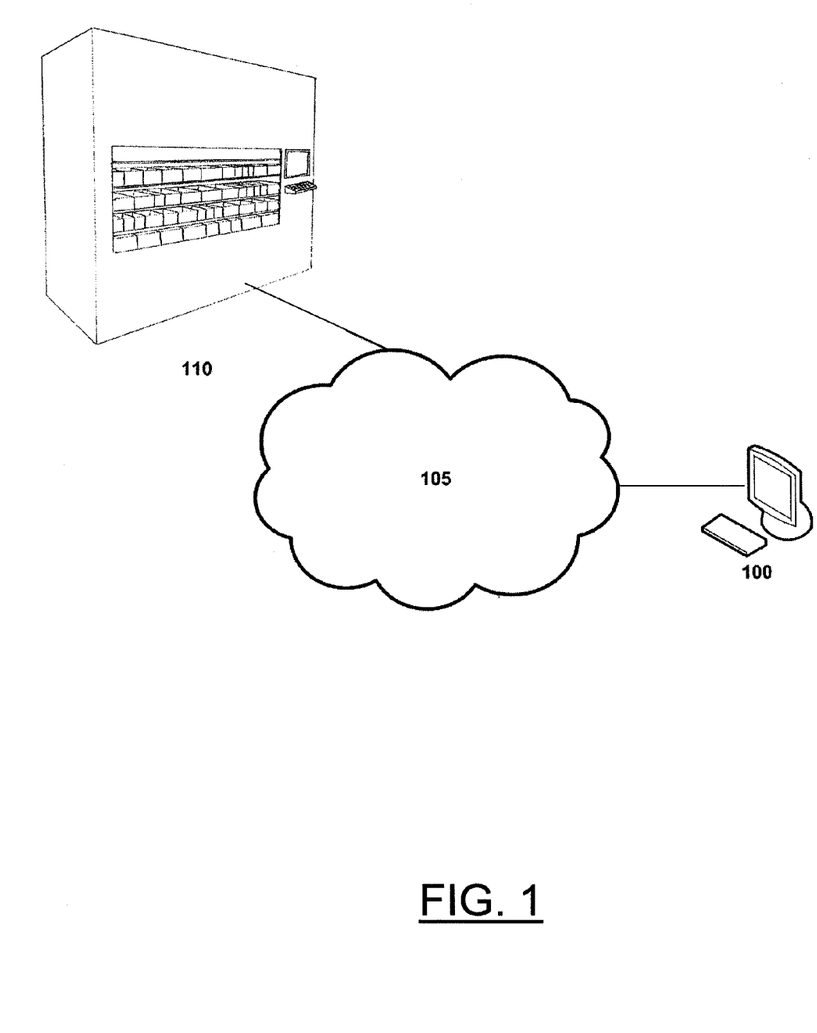
FIG. 1 illustrates a system that can be used in conjunction with various embodiments of the present invention.

FIG. 1 provides an illustration of a system that can be used in conjunction with various embodiments of the present invention. As shown in FIG. 1, an example embodiment of the system may include an automated storage device controller 100, one or more networks 105, and one or more automated storage devices 110. Embodiments may include other network entities from which data may be received from or transmitted to as will be described further below. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates the various system entities as separate, standalone entities, the various embodiments are not limited to this particular architecture.

Figure 2:
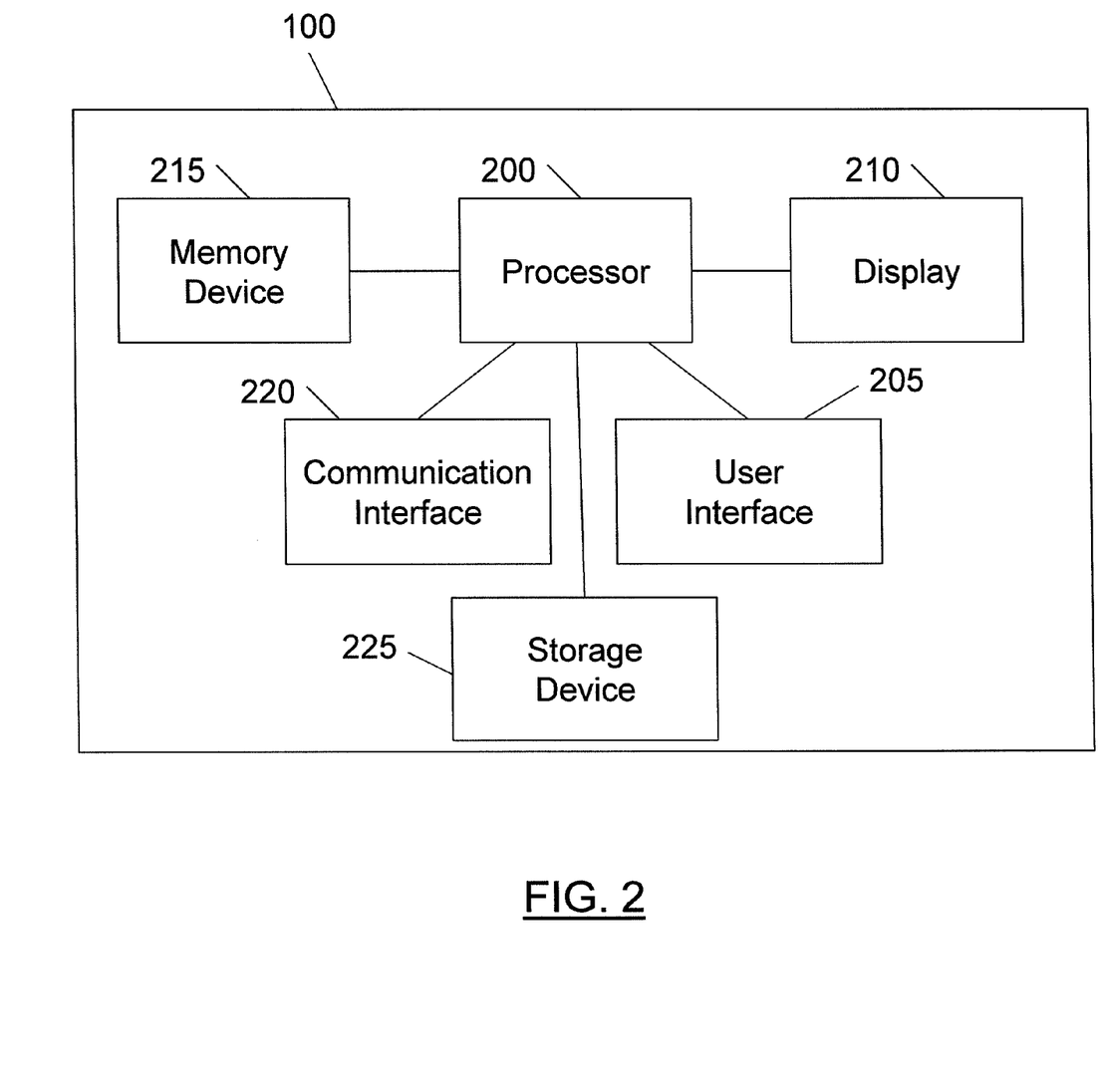
FIG. 2 illustrates a schematic diagram of an automated storage management system according to an example embodiment of the present invention.

FIG. 2 provides a schematic of an automated storage device controller 100 according to one embodiment of the present invention. In general, the term "controller" may refer to, for example, any computer, computing device, mobile phone, desktop, tablet, notebook or laptop, distributed system, server, blade, gateway, switch, processing device, or combination of processing devices adapted to perform the functions described herein. The automated storage device controller 100 may include, be associated with, or be in communication with a variety of computing entities, such as pharmacy inventory management systems, medication dispensing units, data storage/facilitation computing entities, or other devices that may interface with inventory management, dispensing, replenishing, etc. While example embodiments of automated storage devices may be implemented in virtually any setting which may benefit from automated storage and retrieval of articles, embodiments described herein will be described generally with respect to the field of healthcare in which medications, medical devices, and other articles may be dispensed in a healthcare facility. However, it is appreciated that embodiments of the present invention may apply to various other embodiments of automated storage systems and devices.

As will be understood from this figure, in one embodiment, the automated storage device controller 100 may include a processor 200 that communicates with other elements within the automated storage device controller 100 via a system interface or bus. The processor 200 may be embodied in a number of different ways. For example, the processor 200 may be embodied as a processing element, processing circuitry, a coprocessor, a controller or various other processing devices including integrated circuits such as, for example, an application specific integrated circuit (ASIC), a field programmable gate array (FPGA), a hardware accelerator, and/or the like.

In an exemplary embodiment, the processor 200 may be configured to execute instructions stored in memory or otherwise accessible to the processor 200. As such, whether configured by hardware or software methods, or by a combination thereof, the processor 200 may represent an entity capable of performing operations according to embodiments of the present invention when configured accordingly. For example, as discussed in more detail below, the automated storage device controller 100 may be configured, among other things, to receive medication or medical supply orders. The automated storage device controller 100 may also be used to track the frequency with which each storage location within the automated storage device is "touched" or accessed by a user, for example, for the purpose of dispensing an article from or restocking an article to the storage location. A user interface 205 may be configured for user input of orders (medication, supplies, etc.) or to otherwise interact with existing orders. The user interface 205 may include a keyboard, a pointing device, or other mechanism for a user to communicate with the processor 200 and interact with the automated storage device controller 100. A display 210 may be configured to present information to a user pertaining to previous orders, current orders, or future orders for medication or supplies. The display 210 may also be configured to present information to a user pertaining to the status of the automated storage device, information regarding inventory, or any information which may be useful to a user of the device. The display 210 may include a touch screen display which may partially or fully comprise the user interface 205.

The automated storage device controller 100 may further include transitory and non-transitory memory device 215, which may include both random access memory (RAM) and read only memory (ROM). The ROM may be used to store a basic input/output system (BIOS) containing the basic routines that help to transfer information to the different elements within the automated storage device controller 100.

In addition, in one embodiment, the automated storage device controller 100 may include at least one storage device 225, such as a hard disk drive, a CD drive, and/or an optical disk drive for storing information on various computer-readable media. The storage device(s) 225 and its associated computer-readable media may provide nonvolatile storage. The computer-readable media described above could be replaced by any other type of computer-readable media, such as embedded or removable multimedia memory cards (MMCs), secure digital (SD) memory cards, Memory Sticks, electrically erasable programmable read-only memory (EE-PROM), flash memory, hard disk, and/or the like.

Furthermore, a number of executable instructions, applications, scripts, program modules, and/or the like may be stored by the various storage devices 225 and/or within memory device 215. As discussed in more detail below, these executable instructions, applications, program modules, and/or the like may control certain aspects of the operation of the automated storage device controller 100 with the assistance of the processor 200 and operating system, although their functionality need not be modularized. In addition to the program modules, the automated storage device controller 100 may store or be in communication with one or more databases.

Also located within the automated storage device controller 100, in one embodiment, is a communication interface 220 for interfacing with various computing entities. This communication may be via the same or different wired or wireless networks (or a combination of wired and wireless networks). For instance, the communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the automated storage device controller 100 may be configured to communicate via wireless external communication networks using any of a variety of protocols, such as 802.11, general packet radio service (GPRS), Universal Mobile Telecommunications System (UMTS), Code Division Multiple Access 2000 (CDMA2000), CDMA2000 1X (1xRTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth™ protocols, wireless universal serial bus (USB) protocols, and/or any other wireless protocol.

It will be appreciated that one or more of the automated storage device controller's 100 components may be located remotely from other automated storage device controller 100 components. Furthermore, one or more of the components may be combined and additional components performing functions described herein may be included in the automated storage device controller 100.

Figure 3:
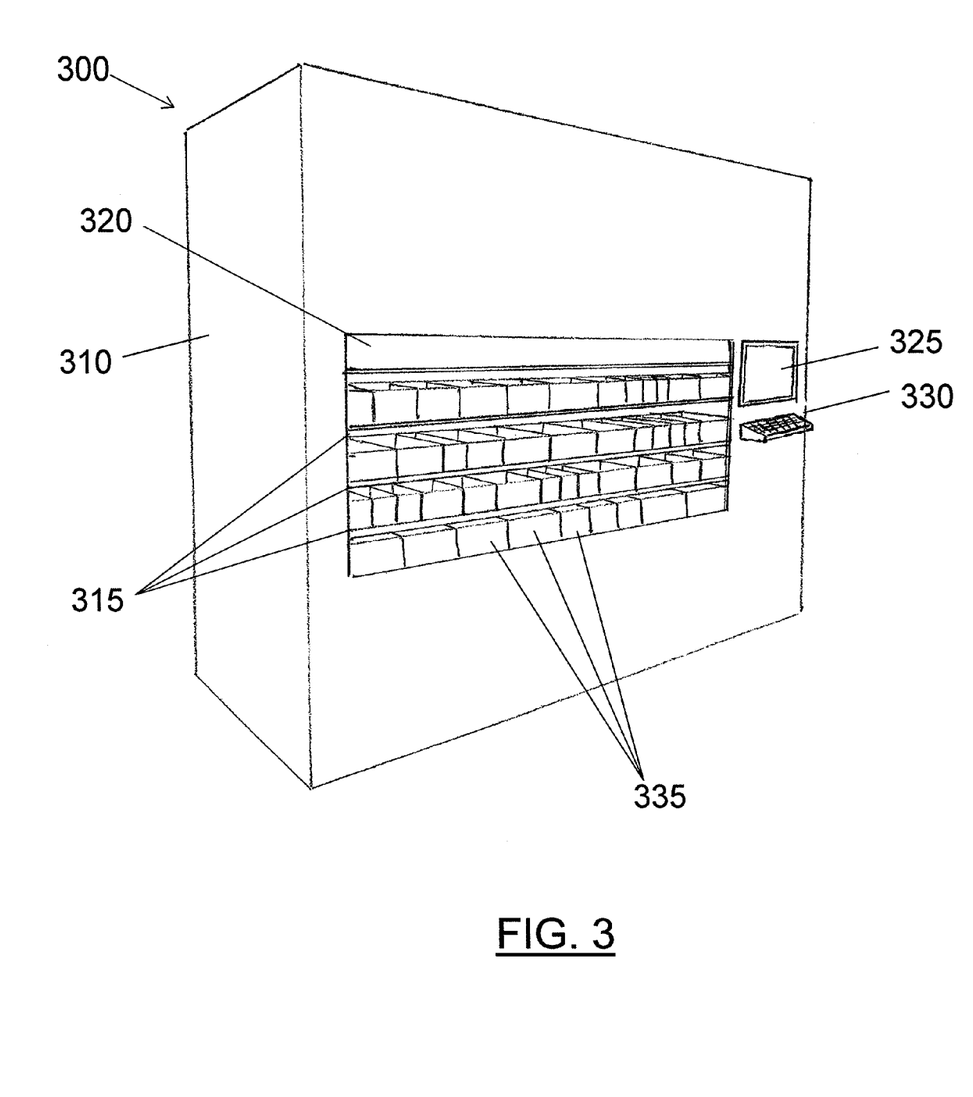
FIG. 3 illustrates an example embodiment of an automated storage device according to example embodiments of the present invention.

In one embodiment, an automated storage device can be used to hold/store/house various medications and/or supplies (e.g., syringes, intravenous bags, etc.). Such storage devices may be used in a variety of environments, including surgical/procedural areas, pharmacies, stock rooms, etc. FIG. 3 illustrates an example embodiment of an automated storage device 300 including a housing 310 enclosing a plurality of storage shelves 315, an opening 320 through the housing providing a user access to the storage shelves 315, and a controller including a display 325 and user interface 330. Each storage shelf 315 may include a plurality of storage bins 335 disposed thereon. The storage bins 335 may be removable and replaceable within the storage shelf 315. While the illustrated embodiment illustrates storage bins 335 as open-top boxes, it is appreciated that storage bins which may be compatible with example embodiments of the invention may include containers of virtually any size and shape and may be fully enclosed, partially enclosed (e.g., an open top or front), or substantially unenclosed. Further, it may be beneficial for example embodiments of the present invention to include a plurality of sizes of bins, such as small, medium, and large bins which may facilitate interchangeability between bins in different locations. Further, bins may include one or more different types of articles stored therein.

The shelves 315 of example embodiments of automated storage devices may be arranged on a carousel to rotate between an accessible position, where a shelf 315 is accessible through the opening 320, and an inaccessible position, where a shelf 315 is located away from the opening 320 within the housing 310. The housing 310 may be of any size to accommodate a plurality of storage shelves 315. The opening 320 may provide access to one or more storage shelves 315 at a time, however, not all storage shelves are accessible simultaneously.

The storage bins 335 of example embodiments may be configured to hold medication or supplies. The quantity of medication or supplies to be stored within an automated storage device may be determined by an inventory management system and may be influenced by the cost of an item (e.g., higher cost inventory items may be stored in lower quantities), size of an item (e.g., larger items may be stored in lower quantities due to space constraints), and/or frequency of use (e.g., frequently used items may be stored in larger quantities in larger bins, or in multiple bins). Storage bins 335 configured to hold small articles, such as individual blister-pack doses of a particular medication, may be configured to hold multiple types of articles, such as three different dosages of a particular medication or multiple articles which are unrelated. Different articles contained in a bin may be similar or dissimilar items.

The controller, as described above, may be configured to receive an order for a particular article (i.e., a medication or supply) and rotate the carousel to present the shelf 315 on which the bin 335 storing the article is located. The specific bin 335 may be identified by indicia displayed on the bin, an identifier presented on the display 325, or a visual flag, such as a light emitting diode (LED) illuminated at the location of the appropriate bin 335. The display 325 may also display the appropriate quantity of the article to be retrieved to fill the order.

The controller may receive orders containing multiple articles of different types (e.g., different supplies or different medications) such that to fill an order, a user must access multiple bins 335. For such an order, the controller may first present the shelf 315 including the bin 335 for the first article, allow the user to retrieve the appropriate quantity of the first article, then rotate the carousel to present the shelf 315 which includes the bin 335 of the next article to be retrieved. If the next article to be retrieved is on the same shelf 315, the carousel may not need to rotate between the retrieval of the articles. However, in some cases, the next article to be retrieved may be disposed in a bin 335 of a shelf 315 that is not close to the opening 320, and the carousel may need to rotate the shelf 315 into the accessible position where the bin 335 is presented to the user.

Figure 4:
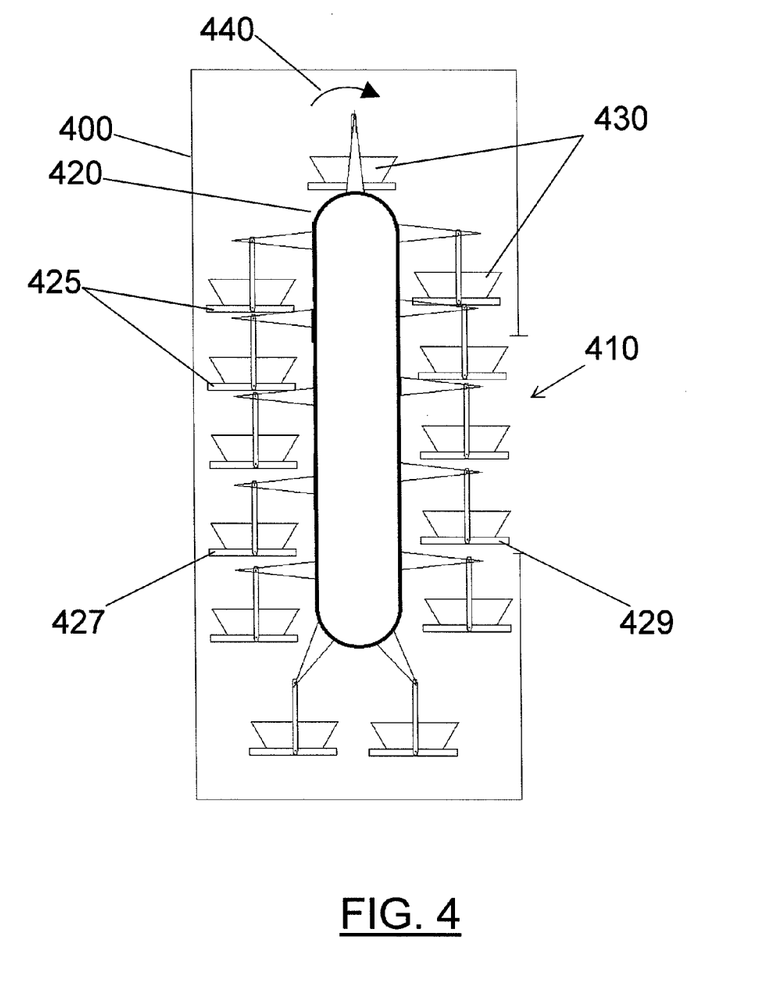
FIG. 4 illustrates an example embodiment of a carousel of an automated storage device according to example embodiments of the present invention.

Example embodiments of automated storage devices may include a plurality of shelves 315 such that the greater the number of shelves in the storage device, the greater the possible distance between a shelf 315 that is currently presented to a user at the opening 320 and a shelf that is located opposite the presented shelf 315. The shelves 315 may be arranged on a carousel that is substantially an endless conveyor which may allow for all of the shelves 315 to cycle through the conveyor path when the carousel is rotated in either a first direction or a second, opposite direction. The endless conveyor on which the shelves 315 may be carried may also allow continuous cycling in a first direction without requiring reversal of the rotating direction. An example embodiment of a carousel of an automated storage device is illustrated in FIG. 4 which depicts a cross section of a profile an automated storage device housing 400 substantially enclosing a carousel 420 that includes a plurality of shelves 425 disposed about the perimeter of the carousel 420. The shelves each include one or more bins 430 disposed thereon. One or more shelves are presented at an accessible position proximate an opening 410 in the housing 400. A user may retrieve the bins 430 or articles from the bins that are located on shelves 425 accessible at opening 410. The carousel may rotate in the direction of arrow 440, or opposite the direction of arrow 440, to move shelves 425 from a previously inaccessible position to an accessible position proximate opening 410.

In the illustrated embodiment, shelf 427 is situated in an inaccessible location such that bins located thereon are not accessible to a user. Shelf 429 is situated in an accessible position where bins located thereon are accessible to a user. For access to the bins of shelf 427, the carousel must rotate in a direction opposite arrow 440 past at least the four shelves in between shelf 429 and shelf 427 in order to place shelf 427 in an accessible position. Such a movement may take a considerable amount of time, particularly when this transition must be performed multiple times during the course of fulfilling a single order. For example, if the time between shelves during rotation of the carousel is three seconds, a user would have to wait at least fifteen seconds to be able to access shelf 427. As will be appreciated, automated storage devices with greater numbers of shelves may incur greater delays as the number of shelves between article locations can be significantly higher. The time between shelves may be referred to as "rotation time" where the carousel is moving.

Figure 5:
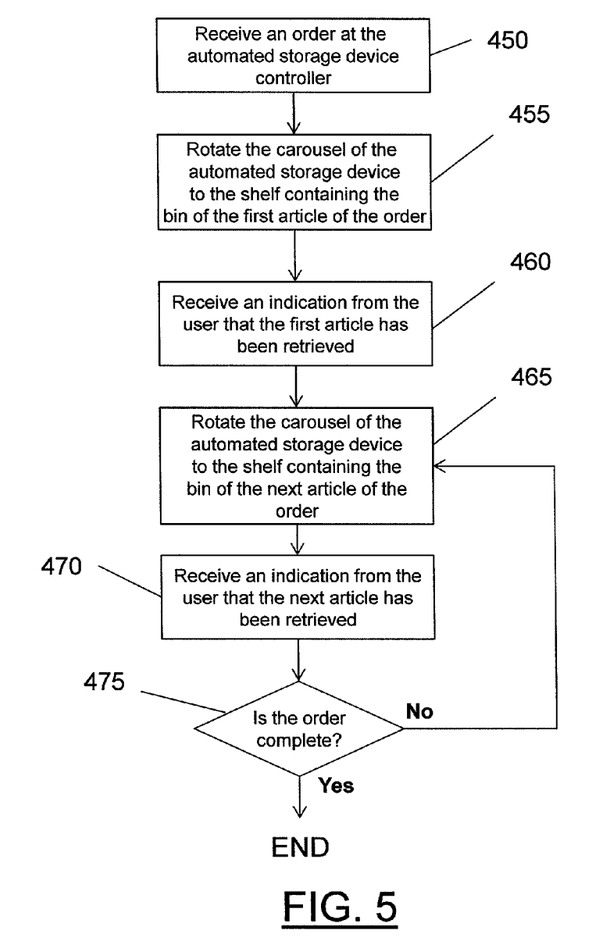
FIG. 5 is a flowchart of a method for retrieving articles from an automated storage device according to example embodiments of the present invention.

In order to reduce delays in filling orders caused by waiting for carousel rotation, it may be desirable to position the most frequently accessed bins proximate one another to minimize the rotation of the carousel between articles as they are retrieved. The general process for filling an order may be represented by the flow chart of FIG. 5 in which an order is received at the automated storage device controller at 450. The order may be received, for example, from a central server of a network, such as an order processing unit in a healthcare facility, or the order may be entered at the controller by a user. The carousel of the automated storage device may be rotated at 455 to place the shelf containing the bin of the first article of the order in an accessible position. After the user retrieves the first article in the necessary quantity, the controller may receive an indication that the first article has been successfully retrieved at 460. The carousel may then rotate to the shelf containing the bin of the next article at 465. Upon retrieval of the next article by the user, the user may provide an indication to the controller that the article was retrieved at 470. A determination may be made as to whether the order is complete at 475. If the order is not complete, the carousel may rotate to the next appropriate shelf for the next article at 465. Once the order is complete at 475, the process may end. As can be appreciated, when numerous articles are to be retrieved, the delay introduced when rotating between shelves to retrieve articles can significantly reduce the efficiency of a user fulfilling an order. The further apart shelves are containing the articles to be retrieved, the greater the delay. Therefore it is desirable to minimize the rotation time of the automated storage device to reduce the overall order fulfillment time and to increase the efficiency of a user of the automated storage device. In order to accomplish this, clustering of the most frequently used articles, or most frequently accessed bins within proximity to one another may be desirable.

While access to bins has been described with respect to retrieval of articles there from, access to a bin may also be needed to re-stock an article in the bin, perform inventory checks, review product information, etc. Each time the bin is accessed it may be considered a "touch." Each bin in an automated storage device may have a number of "touches" that bin has received within a predetermined period of time. For example, a bin that has been accessed 25 times for article retrieval and twice for re-stocking within the last month may be considered to have had 27 touches within a month. In an example embodiment in which a bin holds three types of medication, if the first type of medication has been retrieved 30 times in the last month and restocked once, the second type of medication has been retrieved 45 times in the last month and not restocked once, and the third type of medication has been retrieved 15 times in the last month and restocked twice, the bin would have experienced a cumulative 93 touches (30 retrievals+1 restock+45 retrievals+0 restocks+15 retrievals+2 restocks=93 touches).

Example embodiments of the present invention may be directed to the optimization of bin location based upon the number of "touches" of a bin as the number of articles dispensed from a bin do not necessarily correlate to the number of times a bin must be accessed or "touched." For example, as noted above, the quantity of items stored in a particular bin may be determined based upon one or more of cost, size, frequency of use, etc. The number of "touches" of a bin, as outlined above, may include retrievals, restocks, inventory counts, etc. Therefore, bin optimization performed exclusively by item retrieval frequency may not provide the accuracy afforded by optimization using the number of touches of a bin.

The predetermined period of time may be determined based upon a rolling window, such as the past seven days, or the predetermined period may be since a particular date. For example, if an epidemic occurred or a mild outbreak of a particular virus, the date determined to be at the start of the outbreak may be the date from which the "predefined period" is established to begin, thus providing an accurate record of touches for treating patients during the outbreak.

Optimization of an automated storage device may include moving bins between shelves in order to minimize the anticipated rotation time when filling orders by clustering the most frequently touched bins within close proximity of one another. Such optimization may be performed by an automated storage device controller according to embodiments of the present invention. Optimization according to an example embodiment may be performed based upon the number of touches of a bin. Additionally or alternatively, optimization may be performed based upon a "home shelf" where the goal of the optimization is to have an area of the carousel that is considered "high use" where the majority of articles are retrieved from. The home shelf may be arranged to be the shelf containing the bins with the highest number of touches with the bins with the next highest number of touches located on the shelves before and after the home shelf. Embodiments of the present invention may provide specific instructions for swapping bins between shelves to minimize rotation time of a carousel, thereby reducing the wait time of a user filling orders.

Figure 6:
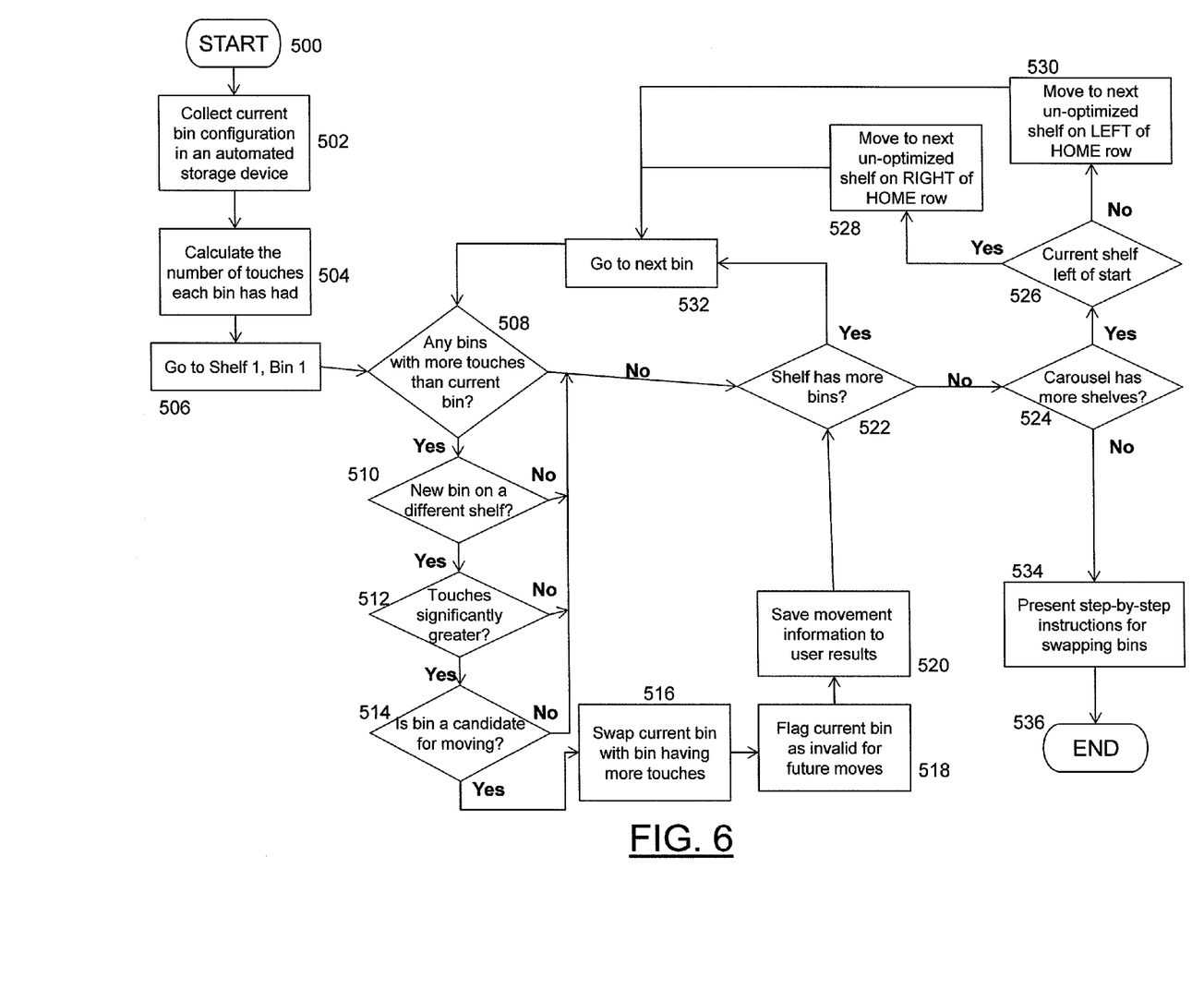
FIG. 6 is a flowchart of a method for optimizing bin location in an automated storage device.

FIG. 6 illustrates a flow chart of a method of optimizing bin location in an automated storage device. The process may begin at 500 and the current bin configuration of the automated storage device may be obtained at 502. The number of touches of each bin is determined at 504. This number may be based upon a predetermined time period, such as a day, a week, a month, or back to a particular date, for example. The organization may begin at any bin on any shelf; however, the present example begins at Shelf 1, Bin 1 where Shelf 1 is the "home shelf" and Bin 1 is a bin within that shelf at 506. At 508 a determination is made as to whether there are any bins that have more touches than the current bin. If there is such a bin, a determination is made as to whether the new bin is on a different shelf at 510. If so, a determination is made as to whether the number of touches are significantly greater, such as by a predetermined threshold (e.g., 50%) at 512. If the number of touches are significantly greater than the current bin, then a determination is made as to whether the bin is a candidate for moving at 514. If the bin with more touches has been moved previously in the optimization routine, the bin is not a candidate for moving. If the bin is a candidate for moving at 514, a swap is planned between the current bin and the bin with more touches at 516. The moved bins are then flagged as invalid for future moves at 518, and the movement information is saved at 520. Methods may also require that the bins can only be candidates for swapping if the bins are of the same size. For example, a small bin may not be able to be swapped with a large bin.

Upon storing the movement information (e.g., in memory device 215 of the controller 100) at 520, or if (1) the bin is not on a different shelf at 510, (2) the touches are not significantly greater at 512, or (3) the bin with more touches is not a candidate for moving, a determination is made as to whether the current shelf has more bins which have not been analyzed for optimization at 522. If the shelf has more bins, the optimization routine goes to the next bin at 532 and that bin is then analyzed to determine if there is a bin with more touches at 508 through 514. If the shelf has no more bins, a determination is made at 524 as to whether the carousel has more shelves. If the carousel does have more shelves, a determination is made at 526 as to whether the current shelf is to the left of the start or "home shelf." If the current shelf is to the left of the home shelf, the next un-optimized shelf to the right of the home shelf is selected at 528 and if the current shelf is not to the left of the home shelf, the next un-optimized shelf to the left of the home shelf is selected at 530 for optimization.

Operations 526, 528, and 530 ensure that the optimization routine begins at the home shelf and works outwardly from the home shelf, alternating sides of the home shelf that are optimized to place the next most touched bins on shelves directly adjacent to the home shelf on both sides. Upon determining which shelf to optimize at 528 or 530, the next bin of the selected shelf is selected at 532 and optimization of that shelf begins. While the flowchart describes shelves to the "left" or "right" of a home shelf, the shelves may also be construed as "above" or "below." The purpose being to ensure that the home shelf includes the bins with the highest number of touches, the shelves immediately adjacent the home shelf on either side include the bins with the next highest number of touches, the bins immediately adjacent those shelves receive the bins with the next highest number of touches, and so on.

Referring again to FIG. 6, once all of the shelves of the carousel have been optimized, the optimization routine determines that no more shelves remain at 524 and step-by-step instructions for swapping bins are prepared. The instructions may be presented, such as on the display 210 of the controller 100, or the instructions may be printed for a user. The user may then use the instructions to swap bins according to the instructions. The instructions for optimization may be presented all at once or printed all at once to provide a list of all bin moves required for optimization.

Optionally, the instructions may be presented on a display one at a time such that an operator may perform the swap instructed, confirm on the display, and the next move may be displayed. In such an embodiment, the operator may perform only the moves that they may have time for. Moves not confirmed may be saved for future use, for example, when the operator next has an opportunity. Moves may be categorized to prioritize the most important or significant moves ahead of those that will have a smaller effect on the overall optimization of the system. For example, a list of moves may be classified as "high priority" such that performing these high priority moves may produce a significant improvement in the efficiency of filling orders. Other moves may be classified as "medium priority" to indicate that the moves may further enhance efficiency, but possibly not as significantly as the "high priority" moves. Further moves may be classified as "low priority" indicating that the low priority moves may only slightly improve order retrieval efficiency. In such an embodiment, an operator may perform only the moves they have time to perform while focusing on the most important or "high priority" moves first.

Figure 7:
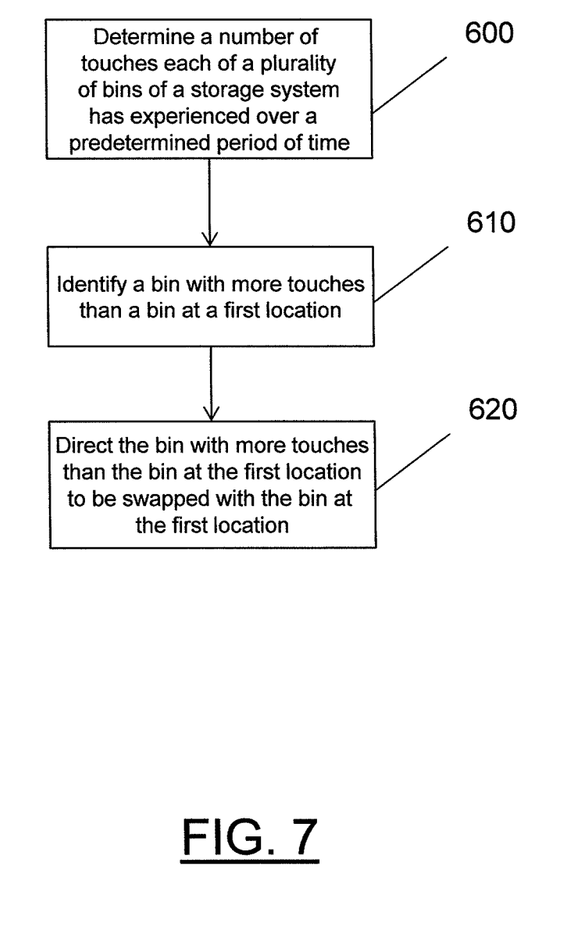
FIG. 7 is another flowchart of a method for optimizing bin location in an automated storage device.

FIG. 7 illustrates another flow chart of a method of optimizing bin location in an automated storage device according to an example embodiment of the present invention. A number of touches that each of a plurality of bins of a storage system has experienced over a predetermined period of time may be determined at operation 600. A bin with more touches than a bin at a first location may be identified at 610. The bin with more touches than the bin at the first location may be directed to be swapped with the bin at the first location at 620.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe some example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method of optimizing the location of a plurality of bins of a storage system comprising:
   determining a number of touches each of a plurality of bins of a storage system has experienced over a predetermined time period;
   identifying a bin with more touches than a bin at a first location, wherein the bin with more touches is at a second location; and
   directing the bin with more touches than the bin at the first location to be swapped with the bin at the first location.

2. The method of claim 1, wherein identifying a bin with more touches comprises identifying a bin with a number of touches that exceeds the number of touches of the bin in the first location by a predetermined amount.

3. The method of claim 1, wherein upon directing the bin from the first location to be swapped with the bin with more touches, precluding the bin from the first location from being moved again.

4. The method of claim 1, wherein the storage system comprises bins of multiple sizes and wherein identifying a bin with more touches than a bin at a first location comprises identifying a bin of the same size with more touches as the bin at the first location.

5. The method of claim 1, wherein the storage system comprises a plurality of shelves, and wherein each shelf comprises a plurality of bins.

6. The method of claim 5, wherein identifying a bin with more touches than a bin at a first location comprises identifying a bin with more touches on a shelf different from that of the bin at the first location.

7. The method of claim 5, further comprising increasing the likelihood that a picked article will be within three shelves of a next-picked article in response to swapping the bin at the first location with the bin at the second location.

8. The method of claim 1, wherein a touch comprises an instance of a user accessing a bin.

9. A computer program product comprising at least one non-transitory computer-readable storage medium having computer-executable program code instructions stored therein, the computer-executable program code instructions comprising:
   program code instructions for determining a number of touches each of a plurality of bins of a storage system has experienced over a predetermined time period;
   program code instructions for identifying a bin with more touches than a bin at a first location, wherein the bin with more touches is at a second location; and
   program code instructions for directing the bin with more touches than the bin at the first location to be swapped with the bin at the first location.

10. The computer program product of claim 9, wherein the program code instructions for identifying a bin with more touches comprises program code instructions identifying a bin with a number of touches that exceeds the number of touches of the bin in the first location by a predetermined amount.

11. The computer program product of claim 9, wherein the program code instructions for directing the bin with more touches than the bin at the first location to be swapped with the bin at the first location further comprises program code instructions to preclude the bin from the first location from being moved again.

12. The computer program product of claim 9, wherein the storage system comprises bins of multiple sizes and wherein the program code instructions for identifying a bin with more touches than a bin at a first location comprises program code instructions for identifying a bin of the same size with more touches as the bin at the first location.

13. The computer program product of claim 9, wherein the storage system comprises a plurality of shelves, and wherein each shelf comprises a plurality of bins.

14. The computer program product of claim 13, wherein the program code instructions for identifying a bin with more touches than a bin at a first location comprises program code instructions for identifying a bin with more touches on a shelf different from that of the bin at the first location.

15. The computer program product of claim 13, further comprising program code instructions for increasing the likelihood that a picked article will be within three shelves of a next-picked article in response to swapping the bin at the first location with the bin at the second location.

16. An apparatus comprising processing circuitry configured to cause the apparatus to:

determine a number of touches each of a plurality of bins of a storage system has experienced over a predetermined time period;

identify a bin with more touches than a bin at a first location, wherein the bin with more touches is at a second location; and direct the bin with more touches than the bin at the first location to be swapped with the bin at the first location.

17. The apparatus of claim 16, wherein identifying a bin with more touches comprises identifying a bin with a number of touches that exceeds the number of touches of the bin in the first location by a predetermined amount.

18. The apparatus of claim 16, wherein upon directing the bin with more touches than the bin at the first location to be swapped with the bin at the first location, precluding the bin from the first location from being moved again.

19. The apparatus of claim 16, wherein the storage system comprises bins of multiple sizes and wherein identifying a bin with more touches than a bin at a first location comprises identifying a bin of the same size with more touches the bin at the first location.

20. The apparatus of claim 16, wherein the storage system comprises a plurality of shelves, and wherein each shelf comprises a plurality of bins.

21. The apparatus of claim 20, wherein identifying a bin with more touches than a bin at a first location comprises identifying a bin with more touches on a shelf different from that of the bin at the first location.

* * * * *